United States Patent
Harada

(10) Patent No.: US 7,637,349 B2
(45) Date of Patent: Dec. 29, 2009

(54) EXHAUST SYSTEM OF MOTORCYCLE AND MOTORCYCLE INCLUDING EXHAUST SYSTEM

(75) Inventor: Keiichi Harada, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 261 days.

(21) Appl. No.: 11/538,355

(22) Filed: Oct. 3, 2006

(65) Prior Publication Data
US 2007/0102224 A1 May 10, 2007

(30) Foreign Application Priority Data
Oct. 7, 2005 (JP) .............................. 2005-294629

(51) Int. Cl.
*F01N 1/08* (2006.01)
(52) U.S. Cl. .................. 181/265; 181/212; 181/227; 181/228; 181/229; 180/309; 296/39.3
(58) Field of Classification Search ............... 181/227, 181/228, 229, 219, 265; 180/309
See application file for complete search history.

(56) References Cited

U.S. PATENT DOCUMENTS

| | | | | |
|---|---|---|---|---|
| 2,940,249 A | * | 6/1960 | Gospodar | 60/313 |
| 3,949,829 A | * | 4/1976 | Honda et al. | 181/227 |
| 4,422,519 A | * | 12/1983 | Nomura et al. | 180/219 |
| RE31,724 E | * | 11/1984 | Isaka | 180/219 |
| 4,484,650 A | * | 11/1984 | Isaka et al. | 180/219 |
| 4,522,282 A | * | 6/1985 | Yamamoto | 180/219 |
| 7,270,206 B2 | * | 9/2007 | Guertler | 180/68.1 |
| 2005/0224273 A1 | * | 10/2005 | Conte | 180/309 |
| 2007/0102224 A1 | * | 5/2007 | Harada | 180/309 |

FOREIGN PATENT DOCUMENTS

| | | | |
|---|---|---|---|
| JP | 57033020 A | * | 2/1982 |
| JP | 57167825 A | * | 10/1982 |
| JP | 58049518 A | * | 3/1983 |
| JP | 58085720 A | * | 5/1983 |
| JP | 58101825 A | * | 6/1983 |
| JP | 58224812 A | * | 12/1983 |
| JP | 59-020518 | | 2/1984 |
| JP | 59-099020 | | 6/1984 |
| JP | 60-017220 | | 1/1985 |
| JP | 62-060914 | | 3/1987 |
| JP | 4040721 | | 7/1991 |
| JP | 11-148347 | | 6/1999 |

* cited by examiner

*Primary Examiner*—Jeffrey Donels
*Assistant Examiner*—Forrest M Phillips
(74) *Attorney, Agent, or Firm*—Hogan & Hartson LLP

(57) ABSTRACT

An exhaust system for a motorcycle provides enhanced steering stability and improved function for purifying exhaust gas. Front exhaust pipes connected with front cylinders of a V-type engine are joined to a front part of an exhaust chamber. Rear exhaust pipes connected with rear cylinders of the engine are joined to an upper part of the exhaust chamber. Exhaust gases discharged from both the front and rear exhaust pipes are unified within the exhaust chamber, and a catalyst is disposed in the vicinity of the unifying section. The length of the rear exhaust pipes is shorter than the length of the front exhaust pipes. High-temperature exhaust gas is introduced to the catalyst contained within the exhaust chamber via the rear exhaust pipes.

12 Claims, 5 Drawing Sheets

[Fig. 1]
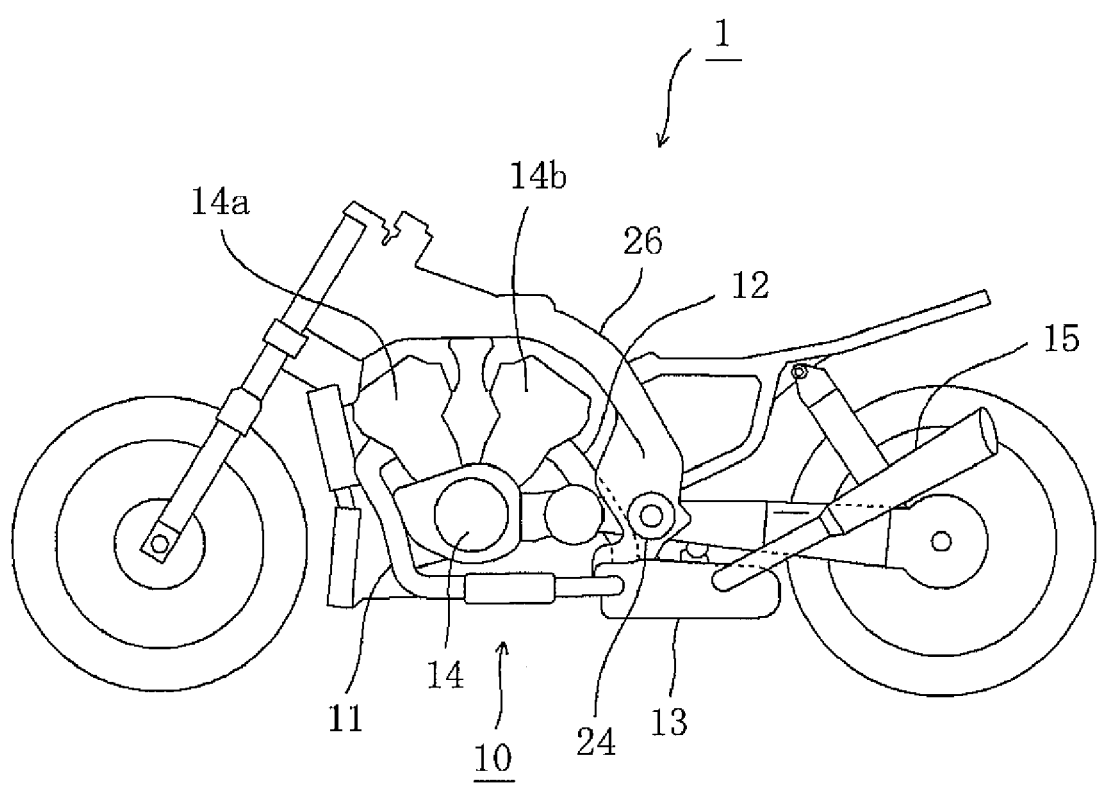

[Fig. 2]
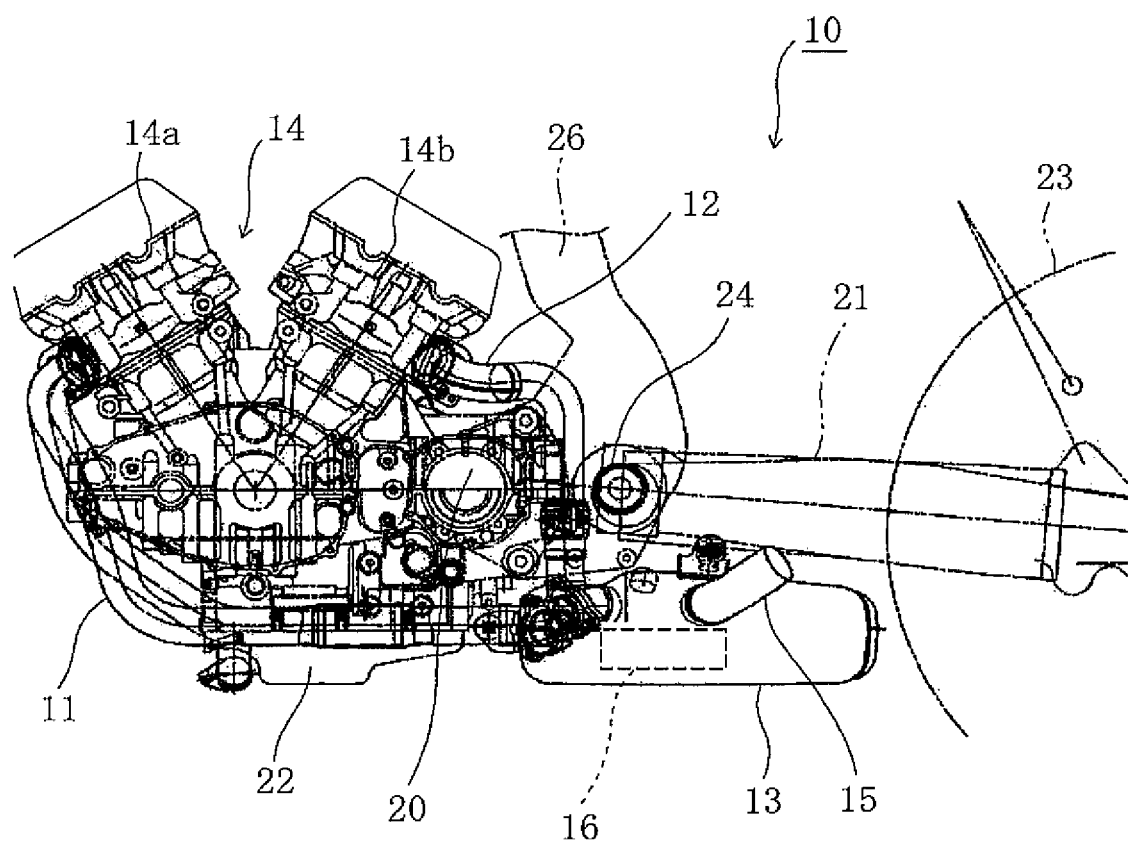

[Fig. 3]
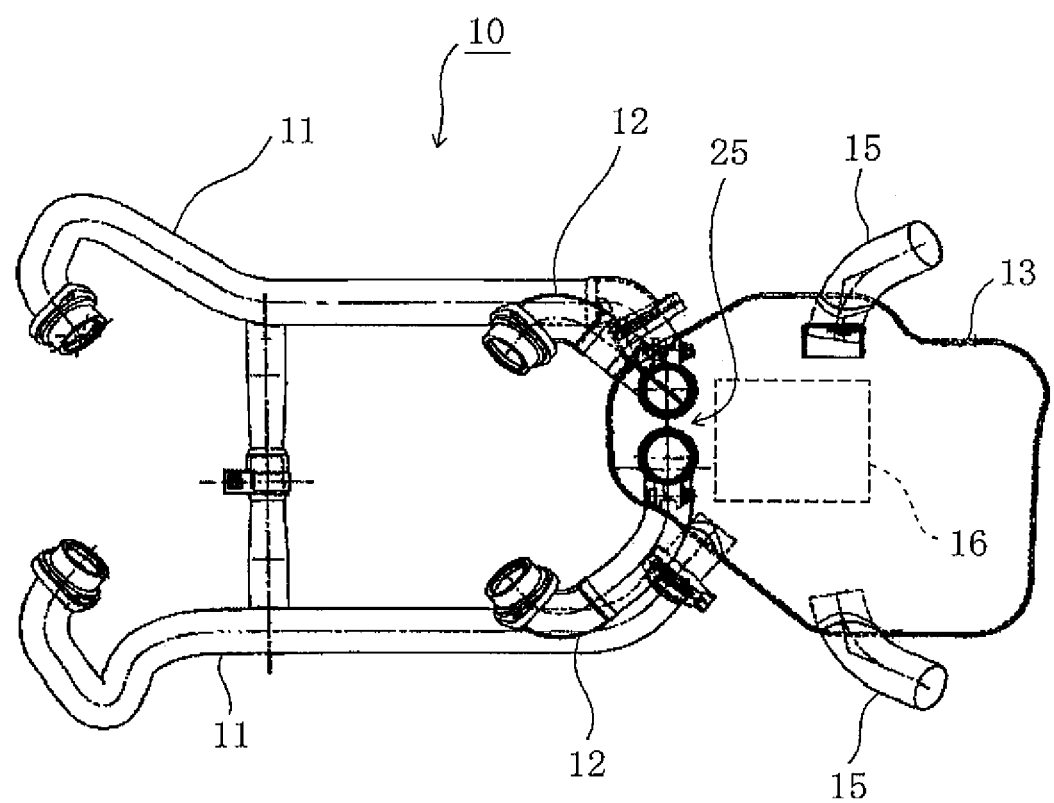

[Fig. 4]
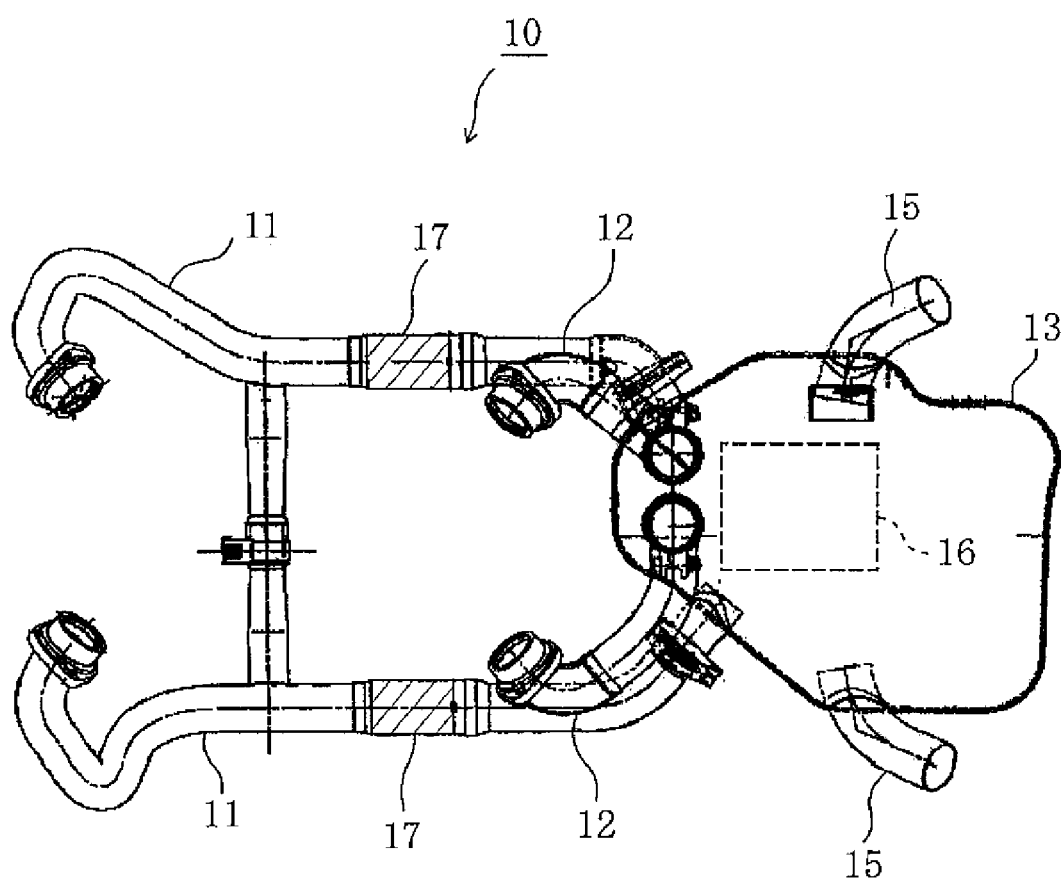

[Fig. 5]
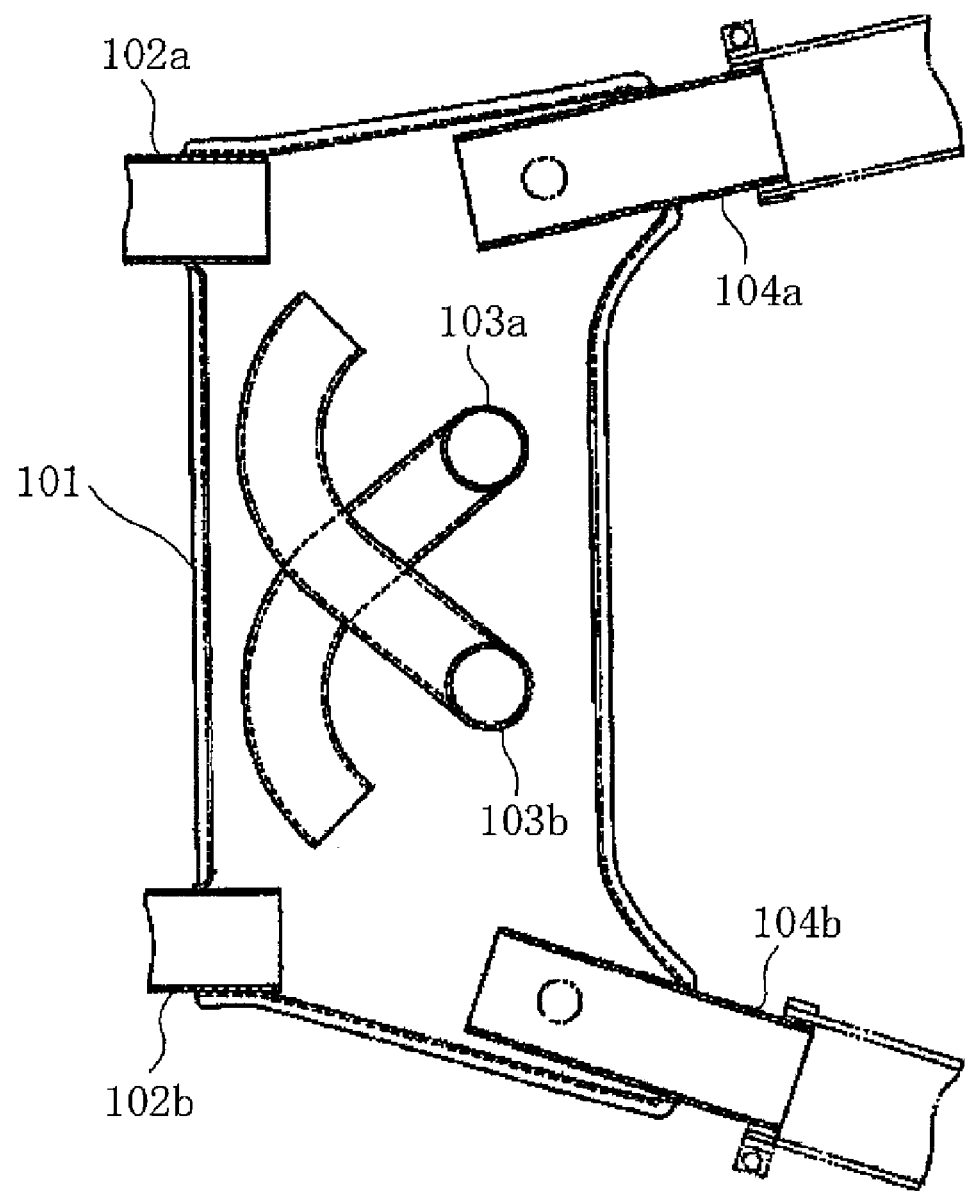

EXHAUST SYSTEM OF MOTORCYCLE AND MOTORCYCLE INCLUDING EXHAUST SYSTEM

RELATED APPLICATIONS

This application claims the benefit of priority under 35 USC 119 of Japanese patent application no. 2005-294629, filed on Oct. 7, 2005, which application is hereby incorporated by reference in its entirety.

BACKGROUND OF THE INVENTION

1. Field of the Invention

The present invention relates to an exhaust system of a motorcycle, and more particularly to an exhaust system of a motorcycle which has a V-type engine and an exhaust gas purifying function.

2. Description of Related Art

In a typical exhaust system of a motorcycle with a V-type engine, front exhaust pipes connected with cylinders disposed in front of an engine and rear exhaust pipes connected with cylinders disposed behind the engine are joined to an exhaust muffler via an exhaust chamber.

In this layout, the front and rear exhaust pipes preferably have an optimum length to secure appropriate function of the engine. While the front exhaust pipes sufficiently have the optimum length, the rear exhaust pipes have only a short length to reach the exhaust chamber and therefore cannot easily obtain the same length as that of the front exhaust pipes.

Considering this limitation, JP-A-62-60914 discloses an exhaust system where the length of the rear exhaust pipes is made substantially equal to that of the front exhaust pipes by connecting the rear exhaust pipes to the exhaust chamber in a zigzag line.

In addition to the requirement for sufficient engine performance, there is also a demand for purification of exhaust gas discharged from the exhaust system. In this regard, JP-A-59-99020 proposes a technique of containing catalyst in the exhaust muffler.

FIG. 5 is a cross-sectional plan view of exhaust chamber 101 of JP-A-59-99020. Front exhaust pipes 102a and 102b are connected with a front part of exhaust chamber 101, and rear exhaust pipes 103a and 103b are connected with an upper part of exhaust chamber 101. Rear exhaust pipes 103a and 103b cross each other within exhaust chamber 101 and extend from the cross point. Open ends of front exhaust pipes 102a and 102b and rear exhaust pipes 103a and 103b are directed toward open ends of joint pipes 104a and 104b, which are joined to an exhaust muffler (not shown).

In this structure, rear exhaust pipes 103a and 103b have sufficient length, and high-temperature exhaust gas discharged from front exhaust pipes 102a and 102b and rear exhaust pipes 103a and 103b is injected to joint pipes 104a and 104b such that exhaust gas is introduced to the catalyst contained in the exhaust muffler without lowering the temperature of the exhaust gas. Thus, performance of the engine is secured and purification of the exhaust gas is promoted.

According to JP-A-59-99020, exhaust gas is purified by a catalyst contained in the exhaust muffler. The catalyst comprises ceramics and metal foil (like a honeycomb) coated with noble metals such as platinum or metal fibers, and thus the weight of the catalyst may be one kilogram or more. Location of such a heavy component at a rear position, away from the center of gravity of the vehicle body, deteriorates steering stability.

Additionally, since the rear exhaust pipes are extended within the exhaust chamber to obtain sufficient length, no space for accommodating a catalyst is left within the exhaust chamber. It is therefore difficult to position the catalyst within the exhaust chamber as well as difficult to locate a heavy component of the motorcycle near the center of gravity of the vehicle body.

SUMMARY OF THE INVENTION

The invention solves the above problems and provides an exhaust system with enhanced steering stability and improved function for purifying exhaust gas.

An exhaust system of a motorcycle according to the invention includes front exhaust pipes connected with front cylinders of a V-type engine, rear exhaust pipes connected with rear cylinders of the engine, and an exhaust chamber connected with respective rear ends of the front and rear exhaust pipes. The rear ends of the front exhaust pipes are connected with a front part of the exhaust chamber. The rear ends of the rear exhaust pipes are connected with an upper part of the exhaust chamber. Exhaust gases discharged from both the front and rear exhaust pipes are unified within the exhaust chamber, and a catalyst is disposed in the vicinity of the unifying section. The length of the rear exhaust pipes is shorter than the length of the front exhaust pipes.

In one embodiment, an exhaust muffler is connected with a rear part of the exhaust chamber.

In one embodiment, catalysts are disposed within some parts of the front exhaust pipes.

In one embodiment, the motorcycle includes a vehicle body frame, a transmission chamber provided behind the engine, a swing arm disposed behind the transmission chamber and supported by the vehicle body frame, and an oil pan below the engine. The exhaust chamber is disposed behind the oil pan and below the space between the transmission chamber and the swing arm.

In one embodiment, the front exhaust pipes extend from the front parts of the front cylinders through the lower part of the engine to be connected with the front part of the exhaust chamber. The rear exhaust pipes extend from the rear parts of the rear cylinders and through the space between the transmission chamber and the support center of the swing arm to be connected with the upper part of the exhaust chamber.

A motorcycle according to the invention includes the exhaust system described above.

In an exhaust system according to the invention, rear exhaust pipes having a shorter length than that of front exhaust pipes are connected with an exhaust chamber so that exhaust gas is introduced to a catalyst contained within the exhaust chamber without lowering the temperature of the exhaust gas, thereby providing efficient purifying function. In addition, since the catalyst is contained within the exhaust chamber, the heavy component of the motorcycle is located near the center of gravity and enhances steering stability.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 illustrates a motorcycle with an exhaust system according to the invention.

FIG. 2 is a side view of the exhaust system according to the invention.

FIG. 3 is a plan view of the exhaust system according to the invention.

FIG. 4 is a plan view of an exhaust system according to another embodiment of the invention.

FIG. 5 is a cross-sectional plan view of an exhaust chamber of a motorcycle in a related art.

DETAILED DESCRIPTION OF THE INVENTION

An embodiment of the invention is now described with reference to the drawings. For simplification, similar reference numerals are given to components with substantially similar functions. The invention is not limited to the illustrated embodiments.

FIG. 1 illustrates a motorcycle 1 including an exhaust system 10 according to the invention.

As illustrated in FIG. 1, a V-type four-cylinder engine 14 is supported by a vehicle body frame 26. Front exhaust pipes 11 and rear exhaust pipes 12 extend to the rear of the vehicle body from, respectively, front cylinders 14a in front of engine 14 and rear cylinders 14b behind engine 14. Respective rear ends of front and rear exhaust pipes 11 and 12 are collectively joined to an exhaust chamber 13. An exhaust muffler 15 is connected with a rear part of exhaust chamber 13.

The basic structure of exhaust system 10 is described with reference to FIGS. 2 and 3.

FIGS. 2 and 3 are side and plan views of exhaust system 10. Rear ends of front exhaust pipes 11 connected with front cylinders 14a of engine 14 are joined to the front part of exhaust chamber 13, and rear ends of rear exhaust pipes 12 connected with rear cylinders 14b of engine 14 are joined to the upper part of exhaust chamber 13. Exhaust gases discharged from both the front and rear exhaust pipes 11 and 12 are unified within exhaust chamber 13. A catalyst 16 is disposed in the vicinity of a unifying section 25 of exhaust chamber 13.

As illustrated in FIG. 2, exhaust chamber 13 is positioned behind an oil pan 22 below engine 14, and located below the space between a transmission chamber 20 behind engine 14 and a swing arm 21 supported by vehicle frame 26 behind transmission chamber 20.

Front exhaust pipes 11 extend from the front parts of front cylinders 14a through the lower part of engine 14 to be connected with the front part of exhaust chamber 13. Rear exhaust pipes 12 extend from the rear parts of rear cylinders 14b through the space between transmission chamber 20 and a support center 24 of swing arm 21 to be connected with the upper part of exhaust chamber 13. This layout shortens the length of rear exhaust pipes 12.

In exhaust system 10, rear exhaust pipes 12 have a shorter length to reach the connecting point with exhaust chamber 13 than that of front exhaust pipes 11 so that exhaust gas discharged from rear cylinders 14b is introduced to catalyst 16 contained in the exhaust chamber through rear exhaust pipes 12 while keeping the highest possible temperature of the exhaust gas. Therefore, the purification function of catalyst 16 is efficiently offered.

Since rear exhaust pipes 12 are connected with the upper part of exhaust chamber 13, the front part of exhaust chamber 13 requires only a width sufficient for connecting with front exhaust pipes 11. Thus, the front part of exhaust chamber 13 has a reduced width as illustrated in FIG. 3. Accordingly, exhaust chamber 13 is positioned closer to the engine, and higher-temperature exhaust gas is therefore introduced to catalyst 16 through rear exhaust pipes 12.

Front exhaust pipes 11 preferably have a sufficient length to obtain appropriate function of engine 14. In this case, the temperature of exhaust gas discharged through front exhaust pipes 11 into exhaust chamber 13 is lowered, but deterioration of the purifying function of catalyst 16 is prevented by unification of exhaust gas from front exhaust pipes 11 and high-temperature exhaust gas from rear exhaust pipes 12 within exhaust chamber 13.

In exhaust system 10, the heavy catalyst 16 is positioned within exhaust chamber 13. As a result, the heavy component of motorcycle 1 is located closer to the center of gravity of the vehicle body and enhances steering stability.

The invention is not limited to this embodiment and also encompasses various modifications and changes. For example, as illustrated in FIG. 4, additional catalysts 17 may be disposed within some parts of front exhaust pipes 11. In this case, high-temperature exhaust gas discharged from front exhaust pipes 11 is primarily purified by catalysts 17 disposed within front exhaust pipes 11 before the temperature of the exhaust gas is lowered, thereby further enhancing the purifying function of the entire exhaust system.

A motorcycle according to the invention is a vehicle which can turn to other directions while inclining its body, such as a motorbike and a motor scooter. Thus, three-wheel vehicles, four-wheel vehicles and vehicles with more wheels that have two or more wheels for at least the front wheel or the rear wheel are all included within the scope of the invention.

The exhaust system according to the invention has enhanced steering stability and improved function for purifying exhaust gas.

The particular embodiments of the invention described in this document should be considered illustrative, rather than restrictive. Modification to the described embodiments may be made without departing from the spirit of the invention as defined by the following claims.

The invention claimed is:

1. An exhaust system of a motorcycle, comprising:
   front exhaust pipes connected with front cylinders of a V-type engine;
   rear exhaust pipes connected with rear cylinders of the engine; and
   an exhaust chamber connected with rear ends of the front and rear exhaust pipes, wherein:
   the rear ends of the front exhaust pipes are connected with a front part of the exhaust chamber;
   the rear ends of the rear exhaust pipes are connected with an upper part of the exhaust chamber at a position that is the same as or forward of, in a fore to aft direction of the exhaust chamber, a position at which the front exhaust pipes are connected to the exhaust chamber;
   exhaust gases discharged from both the front and rear exhaust pipes are unified within a unifying section of the exhaust chamber, and a catalyst is disposed in the exhaust chamber in the rear of and in the vicinity of the unifying section; and
   the length of the rear exhaust pipes is shorter than the length of the front exhaust pipes.

2. An exhaust system according to claim 1, wherein an exhaust muffler is connected with a rear part of the exhaust chamber.

3. An exhaust system according to claim 1, wherein catalysts are disposed within some parts of the front exhaust pipes.

4. An exhaust system according to claim 1, wherein:
   the motorcycle includes a vehicle body frame, a transmission chamber provided behind the engine, a swing arm disposed behind the transmission chamber and supported by the vehicle body frame, and an oil pan equipped below the engine; and the exhaust chamber is disposed behind the oil pan and below the space between the transmission chamber and the swing arm.

5. An exhaust system according to claim 4, wherein:
the front exhaust pipes extend from front parts of the front cylinders and below the engine to be connected with the front part of the exhaust chamber; and
the rear exhaust pipes extend from rear parts of the rear cylinders and through a space between the transmission chamber and a support center of the swing arm to be connected with an upper part of the exhaust chamber.

6. A motorcycle comprising the exhaust system of claim 1.

7. An exhaust system of a motorcycle, comprising:
a front exhaust pipe connected with a front cylinder of a V-type engine;
a rear exhaust pipe connected with a rear cylinder of the engine; and
an exhaust chamber connected with a rear end of the front exhaust pipe and a rear end of the rear exhaust pipe, wherein:
the rear end of the front exhaust pipe is connected with a front part of the exhaust chamber;
the rear end of the rear exhaust pipe is connected with an upper part of the exhaust chamber at a position that is the same as or forward of, in a fore to aft direction of the exhaust chamber, a position at which the front exhaust pipe is connected to the exhaust chamber;
exhaust gases discharged from the front exhaust pipe and from the rear exhaust pipe are unified within a unifying section of the exhaust chamber, and a catalyst is disposed in the exhaust chamber in the rear of and in the vicinity of the unifying section; and
the length of the rear exhaust pipe is shorter than the length of the front exhaust pipe.

8. A motorcycle comprising the exhaust system of claim 7.

9. An exhaust system according to claim 1, wherein the front exhaust pipes are connected to lateral sides of the exhaust chamber.

10. An exhaust system according to claim 7, wherein the front exhaust pipes are connected to lateral sides of the exhaust chamber.

11. An exhaust system according to claim 1, wherein the front exhaust pipes are connected to portions of the exhaust chamber positioned rearward of a front end of the exhaust chamber.

12. An exhaust system according to claim 7, wherein the front exhaust pipes are connected to portions of the exhaust chamber positioned rearward of a front end of the exhaust chamber.

* * * * *